United States Patent [19]
Cohen

[11] Patent Number: 5,344,093
[45] Date of Patent: Sep. 6, 1994

[54] HAND CASTING LINE REEL

[76] Inventor: Jack H. Cohen, Rte. 2 Box 196 A, Templeton, Calif. 93465

[21] Appl. No.: 904,560

[22] Filed: Jun. 26, 1992

[51] Int. Cl.5 .............................................. B65H 75/18
[52] U.S. Cl. .................................... 242/407; 242/588.2
[58] Field of Search ................................. 242/85.1, 96

[56] References Cited

U.S. PATENT DOCUMENTS

| | | | |
|---|---|---|---|
| 1,634,436 | 7/1927 | Polson | 242/85.1 |
| 1,655,065 | 1/1928 | LeBaron | 242/85.1 |
| 3,532,290 | 10/1970 | Sutz | 242/99 |
| 3,817,471 | 6/1974 | Finneman | 242/85.1 |
| 3,832,746 | 9/1974 | Korsgaard | 242/85.1 X |
| 3,901,458 | 8/1975 | Kuncz, Jr. | 242/85.1 |
| 3,934,838 | 1/1976 | D'Amico | 242/85.1 |
| 4,082,235 | 4/1978 | Dauvergne | 242/85.1 |
| 4,123,012 | 10/1978 | Hough | 242/85.1 |
| 4,177,961 | 12/1979 | Gruenewald | 242/85.1 |
| 4,261,529 | 4/1981 | Sandberg et al. | 242/85.1 |
| 4,497,457 | 2/1985 | Harvey | 242/96 |
| 4,721,268 | 1/1988 | Lerner et al. | 242/85.1 |
| 4,872,622 | 10/1989 | Mansfield | 242/85.1 |
| 4,991,788 | 2/1991 | Pattison | 242/85.1 |

Primary Examiner—Daniel P. Stodola
Assistant Examiner—John P. Darling

[57] ABSTRACT

A hand-held line-casting and retrieval reel formed from a slab of material allows virtually drag-free unreeling and rapid retrieval of the line. The reel has a convenient, safe hook position for the reeled-in line.

3 Claims, 3 Drawing Sheets

HAND CASTING LINE REEL

FIELD OF THE INVENTION

This invention relates to the field of fishing tackle, more specifically to an improved line casting and line storage handline reel.

BACKGROUND

In the casting of a line, usually with a weight on the end of the line, the energy to propel the weight for a distance is injected by the caster's arm propelling an end portion of the line with a circular rotation about the hand that grasps the line at the center of rotation. The line is then released and flies off in the direction intended. This is called hand casting.

As the line is propelled, it pulls a continuous source of line length until the weighted end reaches its destination and drops into the water. The supply of line for the aforementioned action might take the form of a coil of line lying on the ground or deck near the caster; it might be wrapped around a cylindrical object such as a coffee can or a soda bottle; or it might be wrapped around a rectangular object such as a board. The line can be retrieved by pulling it hand over hand, or by wrapping it around a board or cylinder.

There is on the market a manufactured plastic, round reel for hand casting and retrieving line. This is a ring about ten inches in diameter made of plastic which is about three inches wide. The ring is dished and rimmed along the outside diameter for holding line. It is rimmed on the inside of the ring to provide a handhold. The purpose of this product is to hold a line for fishing without a pole.

Native fishermen in many countries use handmade fishing boards with line wrapped around them. The line on these boards is wrapped lengthwise parallel to the grain of the wood. The user holds the board on one side. Sometimes an oval is cut into the board creating a handle for holding the board. The board is from three to eight inches wide (across the grain) and is from four to fourteen inches long. Its thickness ranges from one quarter inch to one inch. The length of the board on each end of the handle edge is often from one-half inch to one inch longer to help keep the line being wound from balling off the backside of the board onto the user's hand. A problem with this type of board is that heavy pulling loads, such as from a large fish, can split the board along its grain. Also, when wet, the grain of the board rises creating friction in the process of casting the line, thereby shortening the distance of the cast. Another problem with native boards is that the line can become wound around the use's fingers as line is inadvertently wrapped around the longer sections of the ends. Line that is inadvertently wrapped around the longer sections of the ends also can become dislodged during handling causing slack line that can fall off the reel in a knot.

SUMMARY OF THE INVENTION

The object of this invention is a reel which is as simple as a native handline reel, while at the same time is more compact than the native reels. A further object is to create a reel where cast line unreels with very little resistance. Another object is to create a reel which gathers erratic turns of line during rewinding and concentrates them toward the center of the reel. It is a further object of this invention to provide convenience features for easy and safe stowing of the hook or the line end when the reel is not in use.

The subject invention is a series of improvements of the native handmade board and as such is a reel for casting and retrieval of line. It is cut or cast into a roughly flat, broad shape. This flat broad shape is banded by a perimeter edge. The section of this edge that the operator holds, the handle side edge, and the edge opposite, the far side edge, are called side edges, and are located along the length of the reel, called the sides. Both are arc shaped. The handle side edge is arc shaped away from the body of the reel (convex), while the opposite side, the far side edge, is concavely arc shaped, curving into the body of the reel. The other two opposing sections of edge of the reel are called the winding ends. The two ends each have a parallel section and a section nearer to the handle that flares away from the parallel section. The planes between these sections of perimeter edge are called the faces. Line is wrapped lengthwise around the reel and rests on the parallel section of the ends of the reel. An elongated hole in the body of the reel near the handle side serves as a handhold. There is a small hole through the thickness of the reel, near the handle side. The edge of a side of the reel can have a groove which stops short of violating the ends of the reel. The groove is filled with a foamed, flexible material containing encapsulated gas. Notches can be cut into the edge of a side. Slits can than be cut through the foamed material.

When the reel is used and the line is cast, the reel is pointed by the operator toward the direction that the line is traveling. The parallel end portions and the lack of a lengthwise rim allow the line to unravel off the reel with very little resistance. Experimental reels made with the ends sloped away from the handle, converging away from the handle, performed with farther casting of the line than did the models with parallel ends. The problem though, with the reel with converging ends, is that the line tends to work its way toward the region of shorter distance between the ends. The string would then become slack on the reel, occasionally falling off in a disorderly fashion with tangles in the line. Reels in which the non-parallel edge portions diverge away from the handle hold the line well but they produce decreased distance of casting compared to parallel edges.

At each winding end of the reel, the slope of the flared section moves winds of line to the parallel section of this end. This action keeps winds of line off the fingers of the hand holding the reel and also helps to center the line on the reel. This centering is useful in using the reel for fishing. In fishing, especially for larger fish with lighter line, the "fight" consists of bringing the fish in by reeling in the line, and by also letting the fish "run" or swim away from the fisherman by letting line out. When letting the fish "run", a certain amount of tension is maintained on the line to help tire the fish. One of the ways to keep tension on the line is to hold the line on the reel with the lower fingers of the hand that holds the reel. This same technique is used when casting for a certain target in the water. The payout of the line is stopped in the same way to target the entrance of the bait into the water. The line, when centered, is much easier to control in this manner.

The arc of the handle, while creating a comfortable handle for the user of the reel, also moves the flared ends of the reel away from the hand holding the reel, keeping the string from entangling the fingers of the hand. This improvement, combined with the arc of the opposite edge, results in a reel shaped to minimize length and width and overall bulk, yet maintain maximum winding edge length possible. The small hole next to the handle opening is used for looping and tying the line onto the reel.

The grooves that are located in the handle side edge and its opposite side edge are there to hold the softer, foamed material. This material is important for two reasons: it is used as a place to bury the point end of the hook, and, with the notches that are located side edges, it helps hold the unsecured end of the line.

These invented improvements help make this a quality tool: effective and portable. It is a product complimenting and competing with traditional forms of sport fishing. It is a tool that is small, light and is easy to carry in a backpack, clothes pocket or briefcase.

In summary, the invention is improvements to a casting line reel. The improvements include the flaring of a section of each reeling end toward the operator of the reel. Improvements also include a parallel edge section of each reeling end that is free and clear of any obstructions and stores an inventory of fishing line. Improvements can also be found in the creation of an arc shaped handle and the creation of an arc shaped side of the reel that is opposite the handle. The invention has grooves in the edges of the handle side and its opposite side. These grooves are filled with soft, foamed material which is a receptacle for the hook at the end of the line. Notches through the grooves help hold the end of the line when the reel is not in use. There is a hole through the device through which the operator-end of the line is tied.

DESCRIPTION OF THE PREFERRED EMBODIMENT

Figure 1:
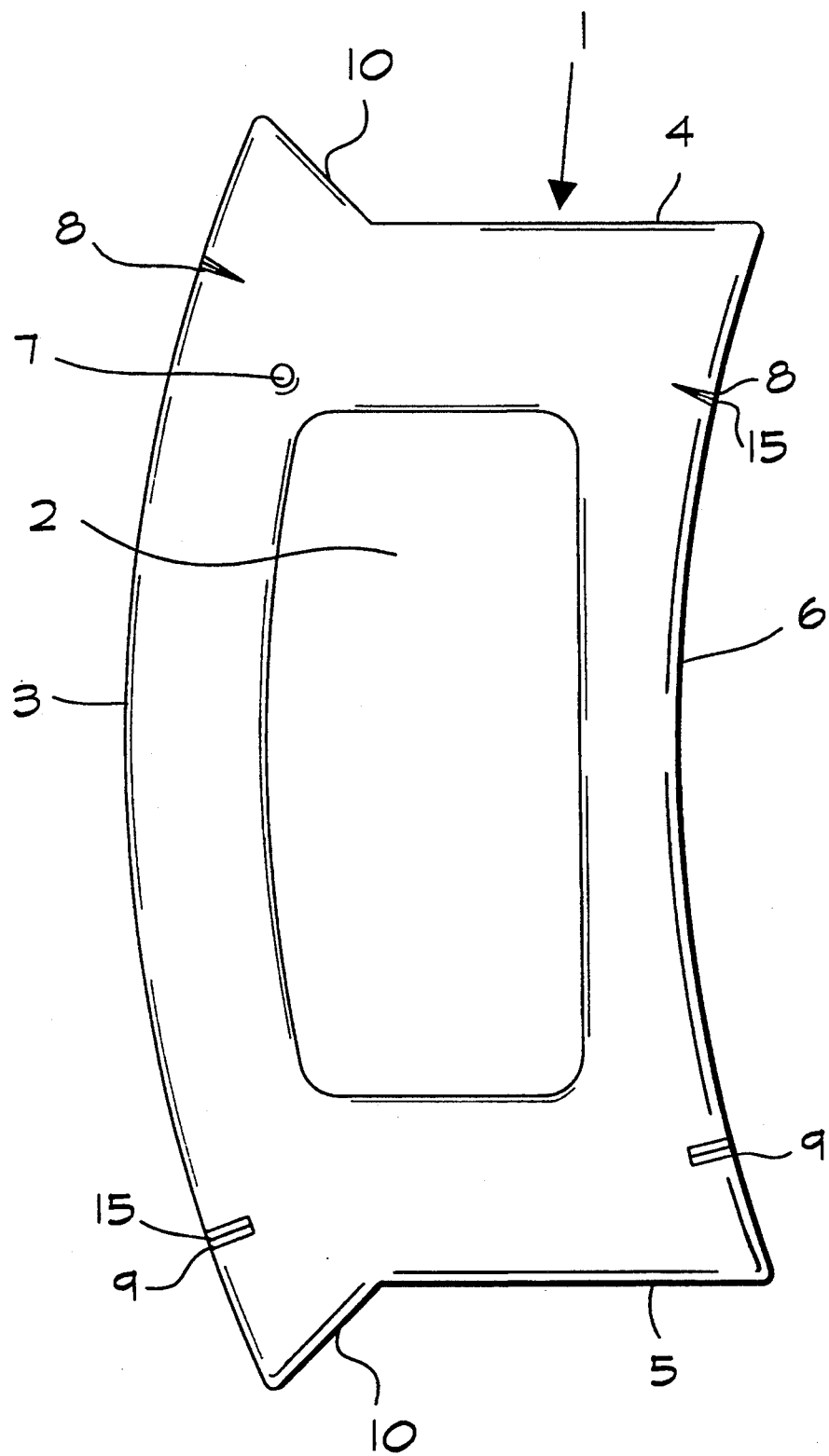
FIG. 1 is a plan view of the reel.

The hand line casting reel 1 in FIG. 1 has and opening 2 for an operator's fingers to grasp the reel, and an edge 3, the handle side, where the operator's hand rests. The hole 7 is for securing one end of the line to the reel by looping the line through the hole 7 and the opening 2 and tying. A section of the ends 4 and 5 is parallel. The inventory of line for the reel is wound around the reel 1 stretching between the ends 4 and 5. The notches 8 and 9 allow the unsecured end of the line to be impressed into the foam to hold the line in place when the reel is not in use. The flared extensions 10 of ends 4 and 5 are for capturing errant turns of line during rapid reeling in of the line. This line slides down the extension 10 to stop on the parallel section of the reeling edges 4 and 5 where it is desired to be.

Edge 3 is an arc that adds to the comfort of the hand hold, places the windings of the string away from the fingers holding the reel, and combines with the arc shaped far side edge 6 to create a smaller lighter reel.

Figure 2:
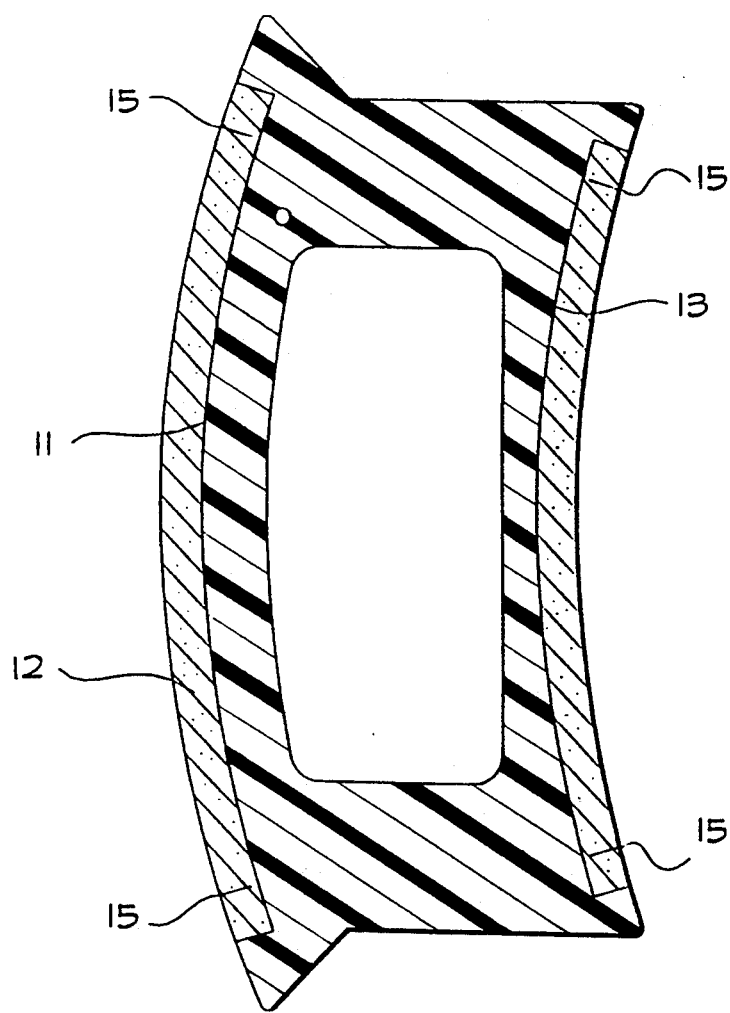
FIG. 2 is a cross section A—A of FIG. 3 that is seen from the same direction as FIG. 1.
Figure 3:
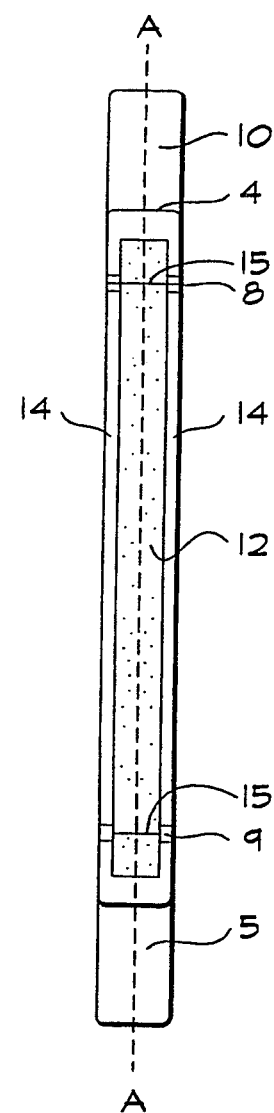
FIG. 3 is an edge view of the reel showing the grooves filled with foamed material and showing four of the edge notches and slits in the foamed material for securing the line.

FIG. 2 is a cross section of the reel through its center showing the groove bottoms 11 and 13 with the soft, foamed material 12 pressed into each groove and against the groove bottoms 11 and 13, and showing cuts 15 which line up with the notches 8 and 9 seen in FIGS. 1 and 3.

FIG. 3 is an end view of the reel as seen looking toward the operator's hand. The edges 14 are formed by the groove which is filled with soft, foamed material 12.

Figure 4:
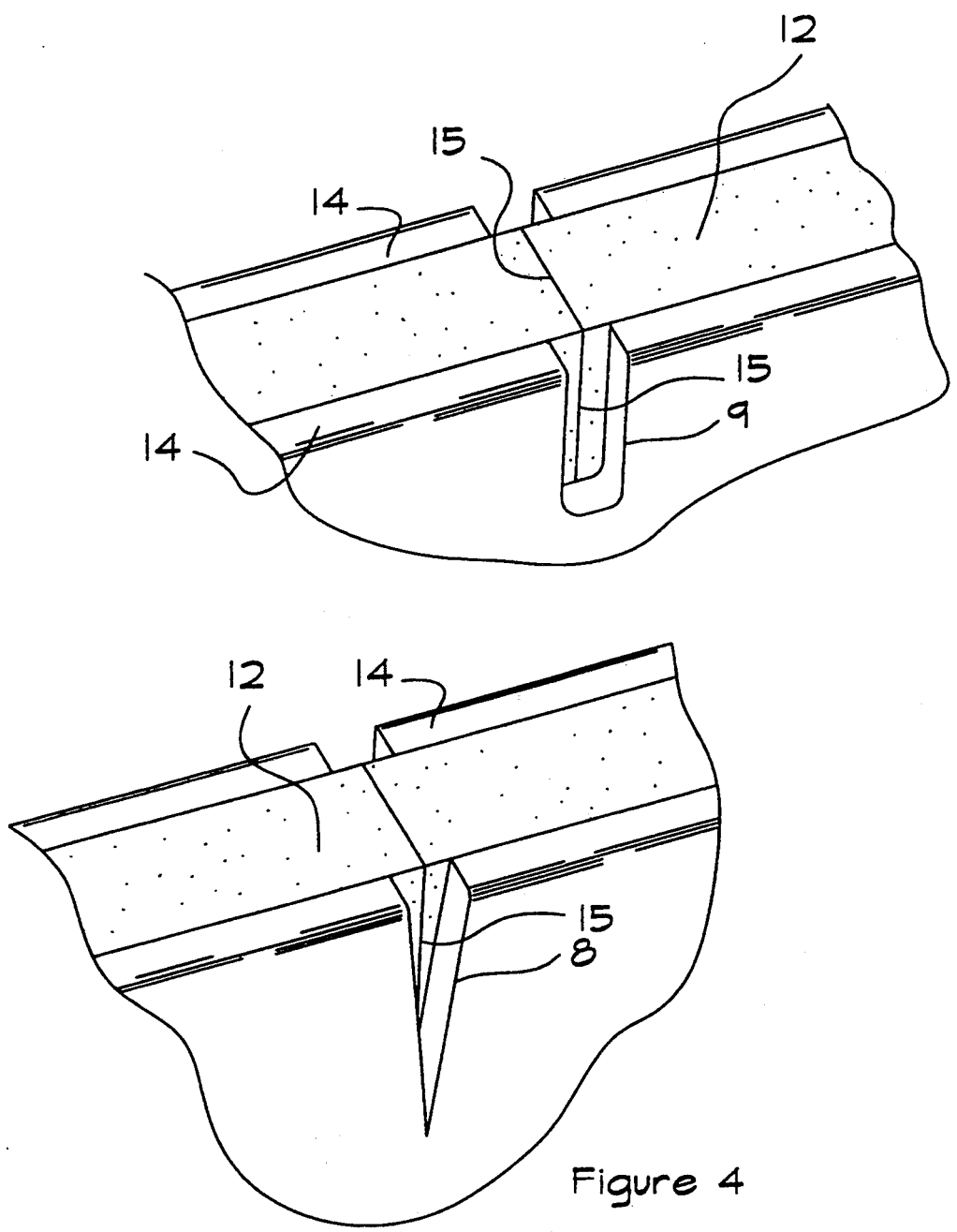
FIG. 4 shows two close-up views of the line-securing notches.

In FIG. 4 small portions of the reel are shown as blown-up isometric views illustrating each of the two types of line-anchoring notches 8 and 9.

I claim:

1. A hand held line casting and retrieval reel consisting essentially of: a planar member, said planar member defining a handle having opposed ends; reeling ends defined by opposed, parallel line holding sections which are each substantially parallel to one another and perpendicularly extending from said handle, whereupon line is wound and stored, and when stored said line stretches between said line holding sections substantially parallel to said handle; an edge opposed to and substantially parallel to said handle and substantially perpendicular to each line holding section, said edge connected to the ends of said line holding sections opposite said handle to define an opening between said handle and said edge providing passage for an operator's fingers; each opposed end of said handle defining a flared extension connecting each opposed end to each line holding section of said reeling ends, each flared extension extending at an angle to a corresponding line holding section and intersecting with an outer edge surface of said handle, each flared extension catching and moving errant winds of said line to said line holding sections of said reeling ends.

2. The reel of claim 1 wherein said handle and said edge are arcuate.

3. The reel of claim 1 further defining a hole through said handle for looping and tying one end of the line to the reel.

* * * * *